United States Patent
Kim

(10) Patent No.: US 6,426,963 B1
(45) Date of Patent: *Jul. 30, 2002

(54) TECHNIQUE FOR CONFIGURING NETWORK INTERFACE CIRCUIT IN INTEGRATED SERVICES DIGITAL NETWORK KEYPHONE SYSTEM

(75) Inventor: Jong-Il Kim, Suwon (KR)

(73) Assignee: Samsung Electronics Co., Ltd., Suwon (KR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/033,531

(22) Filed: Mar. 2, 1998

(30) Foreign Application Priority Data

Feb. 28, 1997 (KR) ................................................ 97/6551

(51) Int. Cl.[7] .................................................. H04J 3/12
(52) U.S. Cl. .................... 370/524; 379/93.01; 379/229; 370/467
(58) Field of Search ................................ 370/465, 466, 370/467, 522, 524, 525, 526, 420; 709/230, 231, 232, 238, 244; 379/93.14, 93.15, 93.01, 229, 231, 236, 237

(56) References Cited

U.S. PATENT DOCUMENTS

| | | | |
|---|---|---|---|
| 5,062,108 A | 10/1991 | Bales et al. | |
| 5,070,524 A | 12/1991 | Mano | |
| 5,239,542 A | 8/1993 | Breidenstein et al. | |
| 5,278,972 A | 1/1994 | Baker et al. | |
| 5,311,590 A | 5/1994 | Arnold et al. | |
| 5,317,630 A | 5/1994 | Feinberg et al. | |
| 5,412,660 A | 5/1995 | Chen et al. | |
| 5,442,630 A | 8/1995 | Gagliardi et al. | |
| 5,481,598 A | 1/1996 | Bergler et al. | |
| 5,530,692 A | * 6/1996 | Avanrgues et al. | 370/467 |
| 5,574,861 A | 11/1996 | Orvig et al. | |
| 5,652,782 A | 7/1997 | Hughes-Hartogs | |
| 5,655,001 A | 8/1997 | Cline et al. | |
| 5,666,349 A | 9/1997 | Petri | |
| 5,784,558 A | * 7/1998 | Emerson et al. | 709/230 |
| 5,949,762 A | * 9/1999 | Green et al. | 370/259 |

FOREIGN PATENT DOCUMENTS

| | | |
|---|---|---|
| EP | 0503487 A2 | 9/1992 |
| EP | 0512351 A2 | 11/1992 |

* cited by examiner

*Primary Examiner*—David Vincent
*Assistant Examiner*—Bob A. Phunkulh
(74) *Attorney, Agent, or Firm*—Robert E. Bushnell, Esq.

(57) ABSTRACT

A technique for configuring a network interface circuit, capable of being commonly used in all countries or networks which have different ISDN protocols, with only one BRI trunk includes the steps of: first storing beforehand in a read only memory (ROM) of the network interface circuit all function programs for supporting an integrated services digital network protocol for each country and network which will be used by the keyphone system, selecting a function program from among the function programs stored in the ROM corresponding the country and kind of network to be operated upon initialization, and setting the selected program, as the function program to be executed.

20 Claims, 12 Drawing Sheets

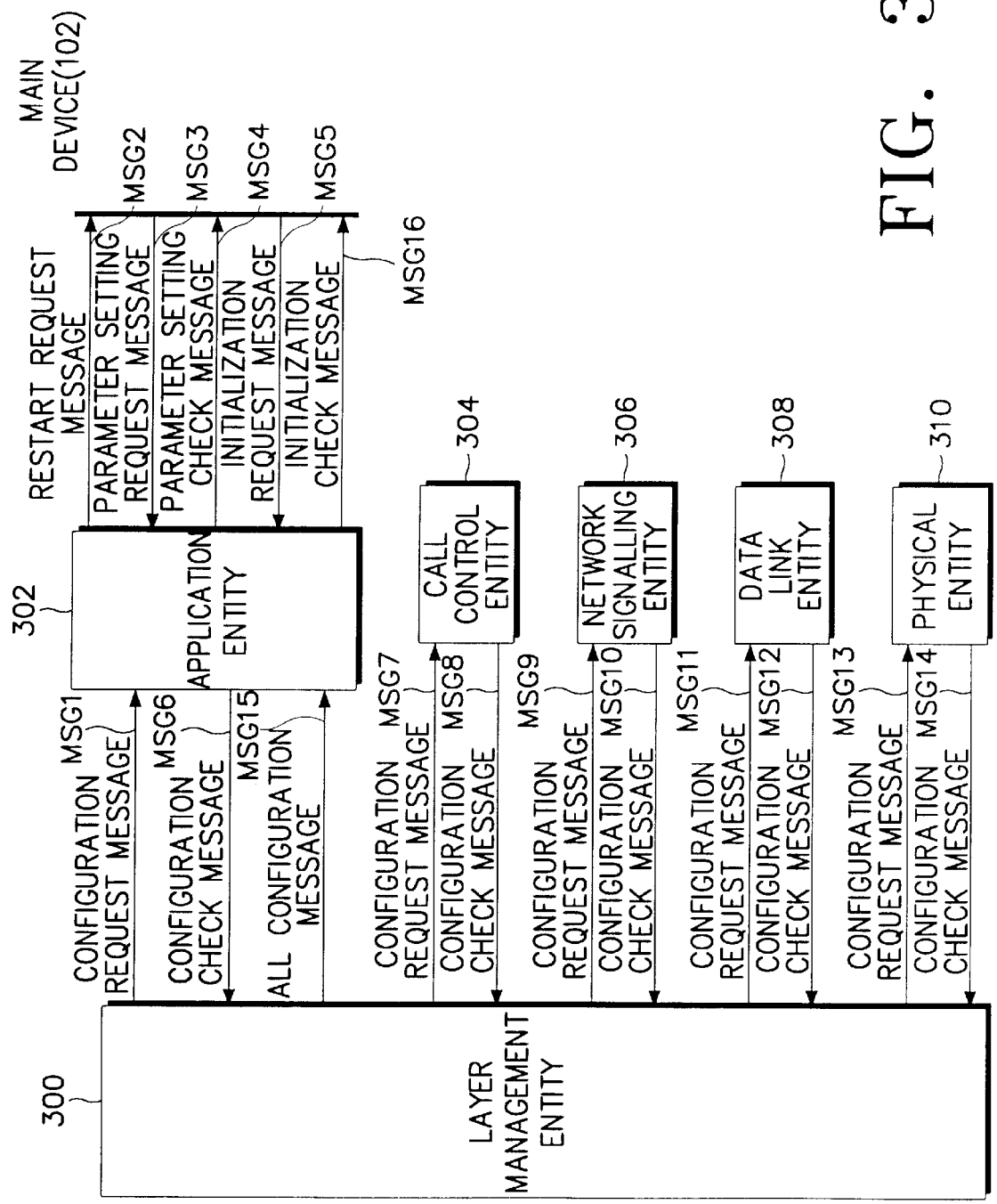

TECHNIQUE FOR CONFIGURING NETWORK INTERFACE CIRCUIT IN INTEGRATED SERVICES DIGITAL NETWORK KEYPHONE SYSTEM

CLAIM OF PRIORITY

This application makes reference to, incorporates the same herein, and claims all benefits accruing under 35 U.S.C. §119 from an application for METHOD FOR CONFIGURING NETWORK INTERFACE CIRCUIT IN INTEGRATED SERVICES DIGITAL NETWORK KEYPHONE SYSTEM earlier filed in the Korean Industrial Property Office on the 28$^{th}$ of February 1997 and there duly assigned Ser. No. 6551/1997.

BACKGROUND OF THE INVENTION

1. Field of the Invention

The present invention relates to a keyphone system and, in particular, to a technique for configuring a network interface circuit for interfacing an analog keyphone system to an integrated services digital network (hereinafter, referred to as an "ISDN").

2. Description of the Related Art

While a typical keyphone system has been used by being interfaced with a public switched telephone network (hereinafter, referred to as a "PSTN"), it has also been recently used with an ISDN. Herein, the keyphone system being interfaced with the ISDN is conventionally called an ISDN keyphone system. The ISDN keyphone system includes a basic rate interface (hereinafter referred to as a "BRI") of the ISDN and a network interface circuit. Therefore, the network interface circuit is generally considered as the BRI trunk.

The BRI trunk, used as a device for interfacing the analog keyphone system with the BRI, performs the ISDN protocol. Also, the BRI is used as an S/T interface of the basic rate interface regulated in the ISDN, that is, an interface line between the ISDN and a terminal, including 2B+D channels comprised of two B channels and one D channel. The B channel is used for transmission of voice and data information with the transmission rate of 64 Kbps and the D channels are used for transmission of a control signal with the transmission rate of 16 Kbps. In this BRI trunk, a function program for supporting the ISDN protocol is installed within a read only memory (hereinafter, referred to as a "ROM") located in the BRI trunk.

Meanwhile, the ISDN protocol depends upon the country or network in most cases. Therefore, when different countries or the networks operate with the ISDN keyphone system, the function program for performing the ISDN protocol by the BRI trunk of the corresponding ISDN keyphone system has to be varied accordingly. Consequently, it is necessary for the ROM included in the BRI trunk to contain a function program in conformity with the corresponding country or network.

As stated hereinafter, since the function program for performing the ISDN protocol for a specific country or a specific network is included in the ROM of the BRI trunk, there is a problem in that the ROM included in the BRI trunk must be replaced with a new ROM in conformity with the corresponding country or network whenever the country or network used by the keyphone system is changed.

The following patents each disclose features in common with the present invention but do not teach or suggest the specifically recited technique for configuring a network interface circuit in an integrated services digital network keyphone system of the present invention: U.S. Pat. No. 5,666,349 to Petri, entitled Method For Controlling Components Of A Communication System, U.S. Pat. No. 5,442,630 to Gagliardi et al., entitled ISDN Interfacing Of Local Area Networks, U.S. Pat. No. 5,574,861 to Lorvig et al., entitled Dynamic Allocation Of B-Channels In ISDN, U.S. Pat. No. 5,481,598 to Bergler et al., entitled Subscriber Terminal For ISDN Network, U.S. Pat. No. 5,070,524 to Mano, entitled Telephone System, U.S. Pat. No. 5,617,630 to Feinberg et al., entitled Interface For A Data Telephone And Data Terminal In A Digital Telephone System, U.S. Pat. No. 5,655,001 to Cline et al., entitled Wireless Telecommunication System Using Protocol Conversion For Signaling Between Base Stations And Land Based Switches, U.S. Pat. No. 5,062,108 to Bales et al., entitled ISDN Codeset Conversion, U.S. Pat. No. 5,239,542 to Breidenstein et al., entitled Time Division Multiplex Switching System For Interconnecting Telephone Circuits Which Operate In Accordance With Different Signaling Systems And Call Formats, U.S. Pat. No. 5,278,972 to Raker et al., entitled Communication System For Converting ISDN Signaling Protocol Between Local And Public Network Having First Group Of Mandatory Elements And Second Group Of Non-Mandatory Elements, U. S. Pat. No. 5,412,660 to Chen et al., entitled ISDN-To ISDN Communication Via Satellite Microwave Radio Frequency Communications Link, and U.S. Pat. No. 5,652,782 to Hughes-Hartogs, entitled Digital Telephone Overcoming International Incompatibilities.

SUMMARY OF THE INVENTION

It is an object of the present invention to provide a technique for configuring a network interface circuit capable of being commonly used, in all countries or networks which have different ISDN protocols, with only one BRI trunk.

In order to achieve the above object, the present invention comprises a technique for configuring a network interface circuit in an integrated services digital network keyphone system, comprising the steps of: first storing beforehand in a read only memory(ROM) of the network interface circuit all function programs for supporting an integrated services digital network protocol for a country and a network which will be used by the keyphone system, selecting a function program from among the function programs stored in the ROM corresponding to the country and kind of network to be operated upon initialization, and setting the selected program as the function program to be executed.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings, in which like reference symbols indicate the same or similar components, wherein:

FIG. 3 is a diagram showing processes of transceiving the configuration message between software modules according to an embodiment of the present invention;

DETAILED DESCRIPTION OF THE PREFERRED EMBODIMENT(S)

Figure 1:
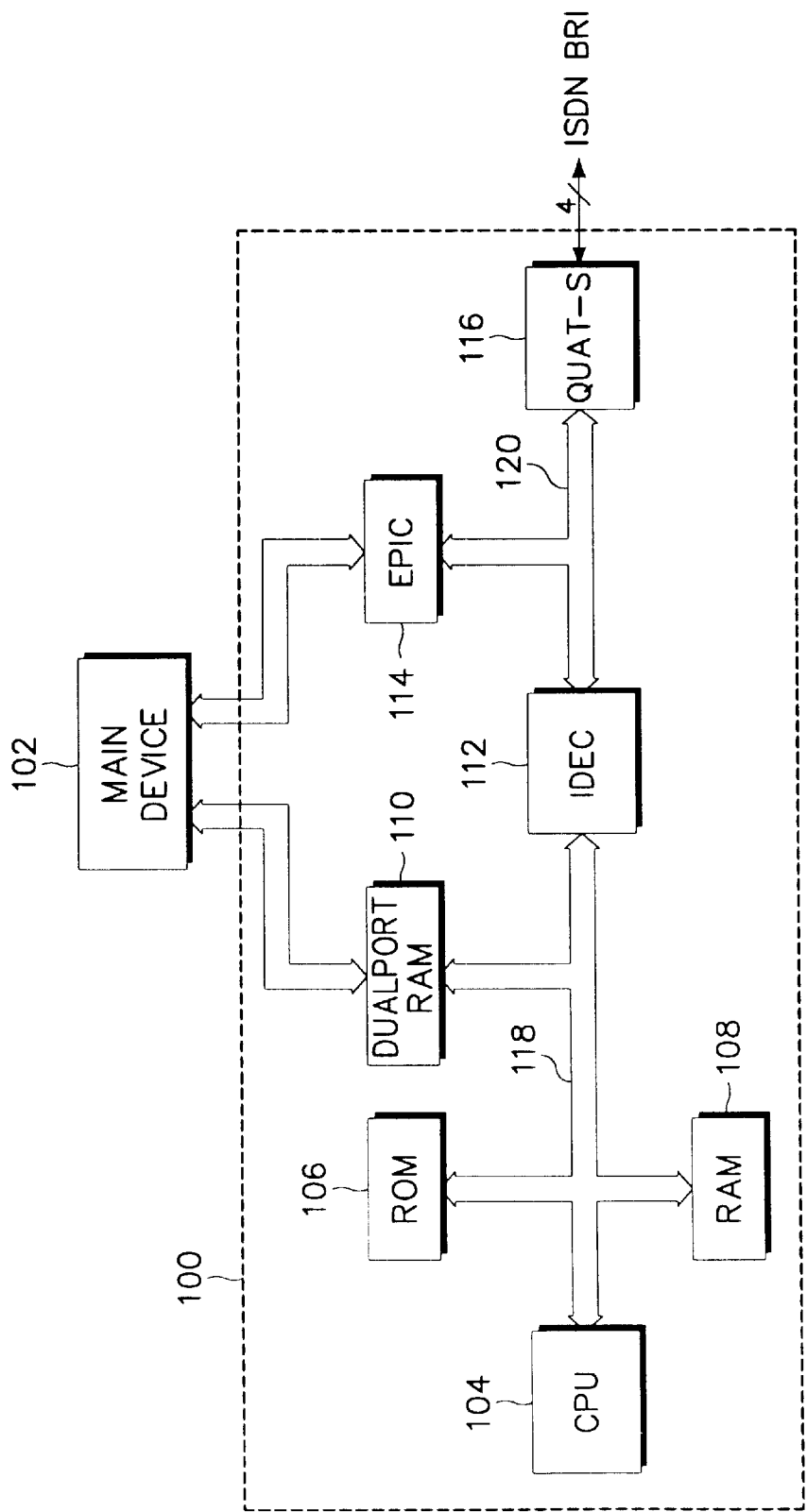
FIG. 1 is a block diagram showing the construction of a BRI trunk of an ISDN keyphone system.

Hereinafter, a preferred embodiment of the present invention will be concretely explained with reference to the accompanying drawings. Most of all, throughout the drawings, it is noted that the same reference numerals or letters will be used to designate like or equivalent elements having the same function. Further, in the following description, numerous specific details such as concrete components composing the circuitry and the frequencies, are set forth to provide a more thorough understanding of the present invention. It will be apparent, however, to one skilled in the art that the present invention may be practiced without these specific details. A detailed description of known functions and constructions unnecessarily obscuring the subject matter of the present invention has been omitted in the following description.

FIG. 1 is a block diagram showing the construction of a BRI trunk 100 of an ISDN keyphone system, where the BRI trunk 100 is connected between a main device 102 of the ISDN keyphone system and 4 lines BRI of the ISDN. The BRI trunk 100 includes a CPU (central processing unit) 104, a ROM 106, a random access memory (hereinafter, referred to as "RAM") 108, a dual port RAM 110, an IDEC (ISDN D-channel exchange controller) 112, an EPIC (extended PCM interface controller) 114, and a QUAT-S (quadruple transceiver for user/network interface-S) 116. The BRI trunk 100 is connected to the main device 102 of the keyphone system. Therein, the main device 102 generally provides the overall function having the exchange service for central office and extension calls in the ISDN keyphone system. The CPU 104, the ROM 106, the RAM 108, the dual port RAM 110, and the IDEC 112 are connected with one another via a CPU bus 118, and the IDEC 112, the EPIC 114, and the QUAT-S 116 are connected with one another via an IOM2 (ISDN-oriented modular 2) interface 120. The CPU bus 118 is comprised of an address bus, a data bus, and a control bus. The IOM2 interface 120, used as a 4-wire serial interface, is constructed with two clock lines for synchronization and two data lines. The data lines are composed of two B channels B1 and B2, a D channel, a monitor channel of 64 Kbps, a command/indication channel of 32 Kbps, and MR and MX channels of 8 Kbps for controlling the monitor channel, for each BRI.

The CPU 104 performs an operation depending upon the program stored in the ROM 106. The CPU 104 communicates with the main device 102 of the keyphone system, performs the ISDN protocol, and provides the interface between the main device 102 of the keyphone system and the BRI of the ISDN. The ROM 106 stores the function program and the reference data for performance of the ISDN protocol. The RAM 108 temporarily stores the data in accordance with performance of the program of the CPU 104. The dual port RAM 110 provides a path for communication with the main device 102, that is, the communication between the CPU 104 and the keyphone system. The IDEC 112, used as the component for controlling four D channels at the same time, can be (for example) a PEB-2075 of the SIEMENS Ltd. company. The EPIC 114, used as the component for switching 32 64 Kbps channels, can (for example) be a PEB-2055 of the SIEMENS Ltd. company, and connects the channel of the main device 102 with the B channel of the BRI connected to the QUAT-S 116. The QUAT-S 116, used as four BRI interface component, can be a PEB-2084 of the SIEMENS Ltd. company, and connects the BRI trunk 100 to the BRI as four wire ISDN physical lines. The BRI trunk 100 performs all of protocols related to the ISDN as mentioned previously and transceives the message necessary for performance of the ISDN protocol with the main device 102 of the keyphone system through the dual port RAM 110.

Figure 2:
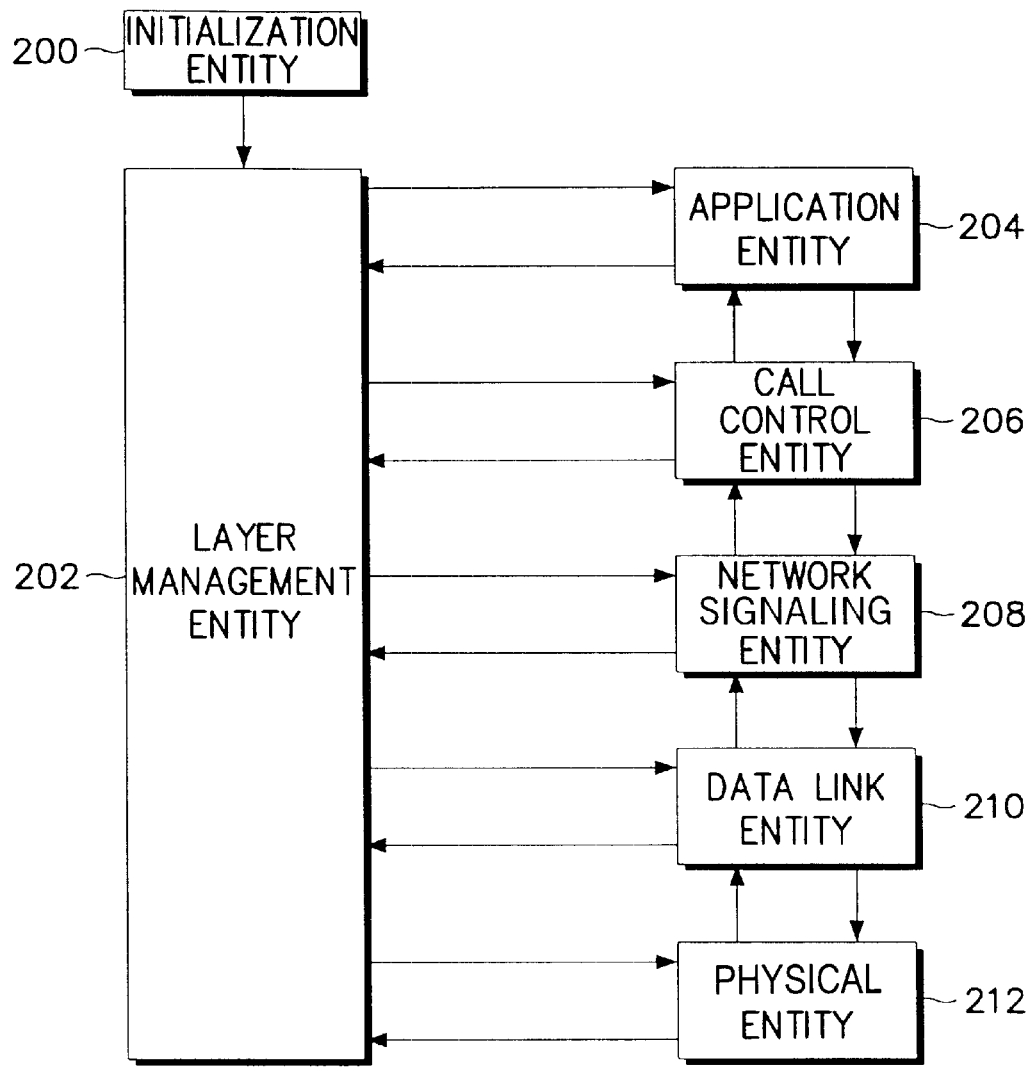
FIG. 2 is a block diagram showing the construction of software for performing an ISDN protocol in the BRI trunk of an ISDN keyphone system.

In the BRI trunk 100, the software for performing the ISDN protocol by the CPU 104 includes an initialization entity 200, a layer management entity 202, an application entity 204, a call control entity 206, a network signaling entity 208, a data link entity 210, and a physical entity 212, as shown in FIG. 2. FIG. 2 is a block diagram showing the construction of software for performing the ISDN protocol in the BRI trunk of an ISDN keyphone system. Also, in FIG. 2, the program is divided into software modules according to the nature of the job and each module is called an entity. The entities are executed by the CPU 104 and the arrows connecting entities comprise the message flow between entities.

The initialization entity 200 among these entities is the module which is firstly performed after resetting the BRI trunk 100 or power on resetting the keyphone system. The initialization entity 200 sets all kinds of initial values of the system and transmits the configuration start message, to perform the configuration for each layer, to the layer management entity 202.

The layer management entity 202 is the module for managing all of the entities, namely, the application entity 204, the call control entity 206, the network signaling entity 208, the data link entity 210, and the physical entity 212. The layer management entity 202 performs the configuration for each layer and manages the significant event influenced by the other entities among the events generated at each entity. As an example of the event, there is often generated line damage at the physical entity 212.

The application entity 204 is the module for transceiving the message with the main device 102 of the keyphone system a shown in FIG. 1. The application entity 204 changes the message received from the main device 102 of the keyphone system into the message format processed by the call control entity 206, transmits the changed message, changes the message received from the call control entity 206 into the message format processed by the main device 102 of the keyphone system, and transmits the changed message.

The call control entity 206 is the module for managing the call and interfacing with the application entity 204. The call control entity 206 receives the message related to the performance of the user from the application entity 204, makes the message conform with the currently-selected ISDN protocol, and transmits the message to the network signaling entity 208. When receiving the message from the network signaling entity 208, the call control entity 206 checks whether or not the received message conforms with the selected message, and transmits the checked result to the application entity 204. When a response for transmitting the message to the network is required, the call control entity 206 generates the response message and transmits the generated message to the network signaling entity 208.

The network signaling entity 208 is the module for performing the D channel signaling protocol. The network signaling entity 208 checks whether or not the message received from the data link entity 210 conforms with the selected message, and transmits the checked result to the call control entity 206. The network signaling network 208 generates the message requiring the transmission from the call control entity 206 to the network, in accordance with the currently-selected ISDN protocol, and transmits the generated message to the data link entity 210.

The data link entity 210 is the module for performing an LAPD (link access procedure on D channel) protocol or an LAPB (link access procedure on B channel) protocol, and selects the LAPD or the LAPB depending upon its configuration. The data link entity 210 receives the message for transmission from the network signaling entity 208, generates the message in conformity with the format of the currently-selected ISDN protocol, and transmits the generated message to the physical entity 212. The data link entity 210 checks whether or not the message received from the physical entity 212 conforms with the selected ISDN protocol and transmits the checked result to the network signaling entity 208.

The physical entity 212 is the module directly connected in a hardware mannerto the ISDN physical line, and manages the deactivation and the activation of the physical line. The physical entity 212. receives the message for transmission from the data link entity 210 and transmits the received message through the ISDN physical line to the HDLC (high-level data link control) frame. The physical entity 212 transmits the HDLC frames received from the ISDN physical line to the data link entity 210.

In the BRI trunk as described above, the present invention can commonly use the ISDN protocol for all countries or networks with only one BRI trunk. To meet it, the present invention previously stores the function program, for supporting the ISDN protocol for the expected country or network which will be used by the ISDN keyphone system, in the ROM 106 of the BRI trunk 100. At this point, the present invention beforehand makes a list of the start addresses for each function program as an all function list table and stores the all function list table in the ROM 106. The function program stored in the ROM 106 is equal to the conventional function program for supporting the corresponding ISDN protocol. Also, the present invention beforehand makes the kind of countries and networks applicable to the ISDN protocol by the function program stored in the ROM 106, namely, the list of the country codes and the network codes form the country-network list table and the table is stored in the ROM 106.

Herein, the program of the country-network list table will be given hereinafter.

construct network COUNTRY_NETWORK=
     {{EUROPE, ETSI},
     {FRANCE, FT_VN3},
     {UK, BT_ISDN2},
     {GERMANY,DT_1TR6},
     {SWEDEN, SWD_TVKT},
     {BELGIUM, BG_V1),};

In this state, during the initial operation, the CPU 104 of the BRI trunk 100 performs the configuration operation according to the configuration message transceiving procedure of FIG. 3 and in accordance with an embodiment of the present invention, receives the information for the countries and kinds of networks to be currently operated from the main device 102 of the keyphone system, and forms the execution function table. In this instance, the main device 102 of the keyphone system transmits the information, for the countries and kinds of networks to be currently operated, to the BRI trunk 100. The execution function table is comprised of the start address list of the function program corresponding to the countries and the networks to be currently operated by the function program belonging to the all function list table. The countries and kinds of networks to be currently operated means the kind of ISDN installed and connected currently to the ISDN keyphone system. Thereafter, the BRI trunk 110 can provide normal services by performing the ISDN protocol according to the countries and kinds of networks to be currently operated by the execution function program depending upon the execution function table formed as stated above. Accordingly, even if the country and the network are varied by making the execution function table select the function program according to the countries and the networks to be currently operated from the all configuration function list upon initialization, the present invention has no need to replace the ROM 106 of the BRI trunk 100 with a new ROM.

Now, the present invention will be more concretely explained below with reference to FIGS. 3 to 10.

FIG. 3 is a diagram showing processes of transceiving the configuration message between software modules according to an embodiment of the present invention, and shows the kind and the transmission direction of the message transmitted according to an embodiment of the present invention between the main device 102 of the keyphone system and the entities as depicted in FIG. 2 and as performed in the CPU 104 of the BRI trunk 100 as illustrated in FIG. 1. The arrows connected between the entities indicate the transmission direction of the message, and reference numerals MSG1 to MSG16 at each arrow indicate message generation order. The procedure of processing the message generation orders MSG1 to MSG16 is called a "configuration procedure". Further, in the following description, each message transmitted between the entities is for convenience of explanation, explained by referring to the corresponding order of the message generation orders MSG1 to MSG16. Furthermore, the transmission of the message between the entities is performed for itself by the CPU 104 and the transmission of the message between the application entity 302 and the main device 102 of the keyphone system is performed by the dual port RAM 110.

Figure 4A:
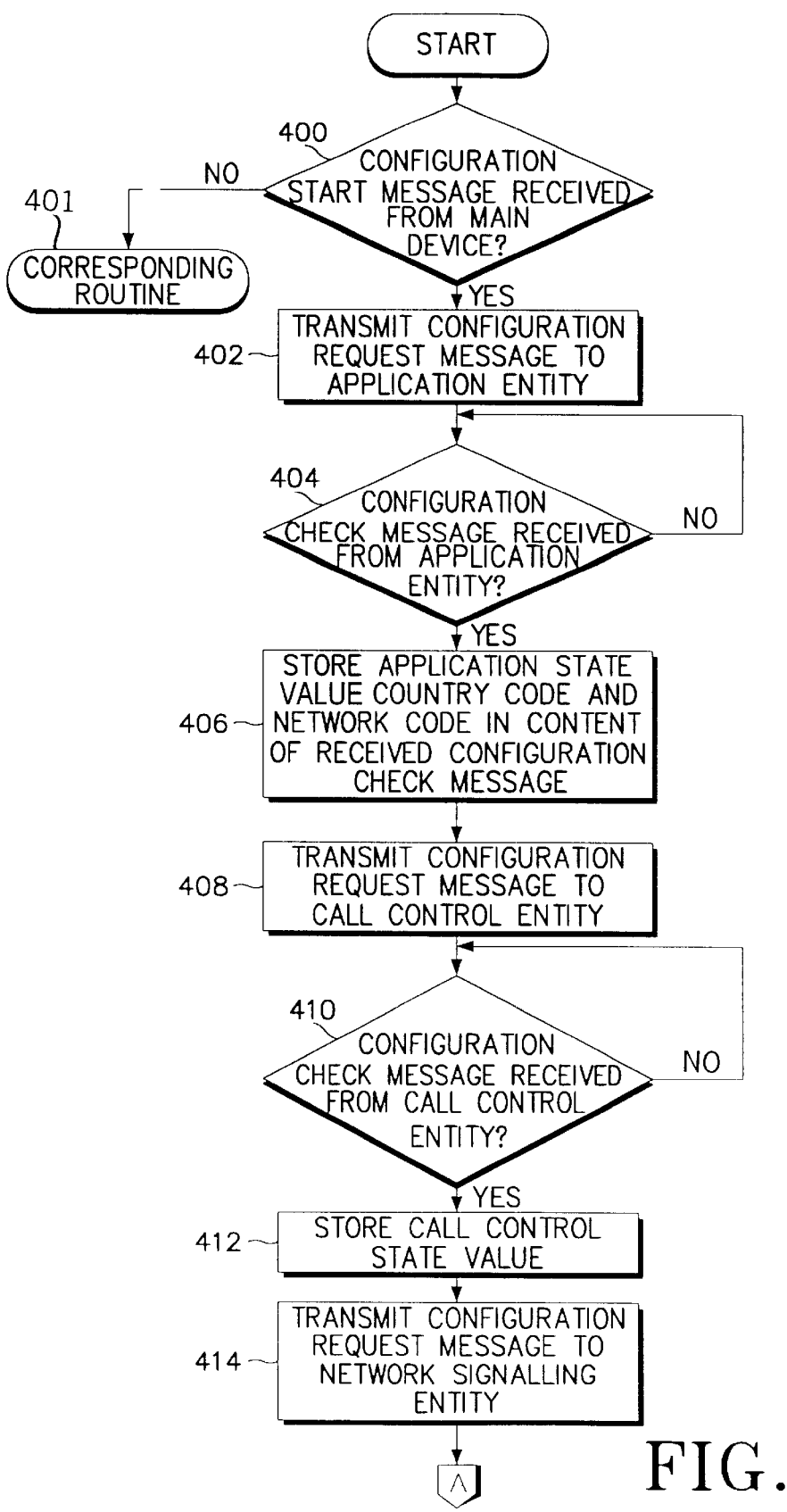
FIGS. 4A and 4B are flowcharts showing processes for processing a layer management entity according to an embodiment of the present invention.
Figure 4B:
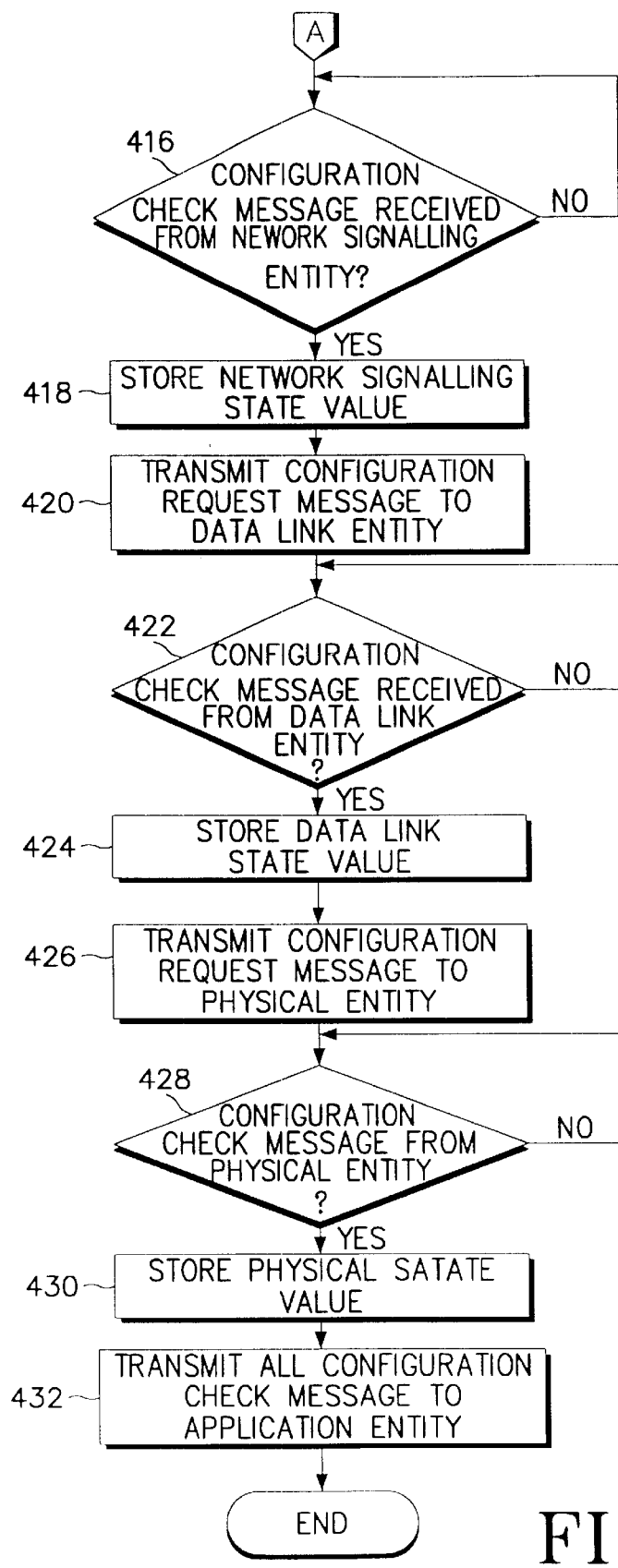
Figure 9:
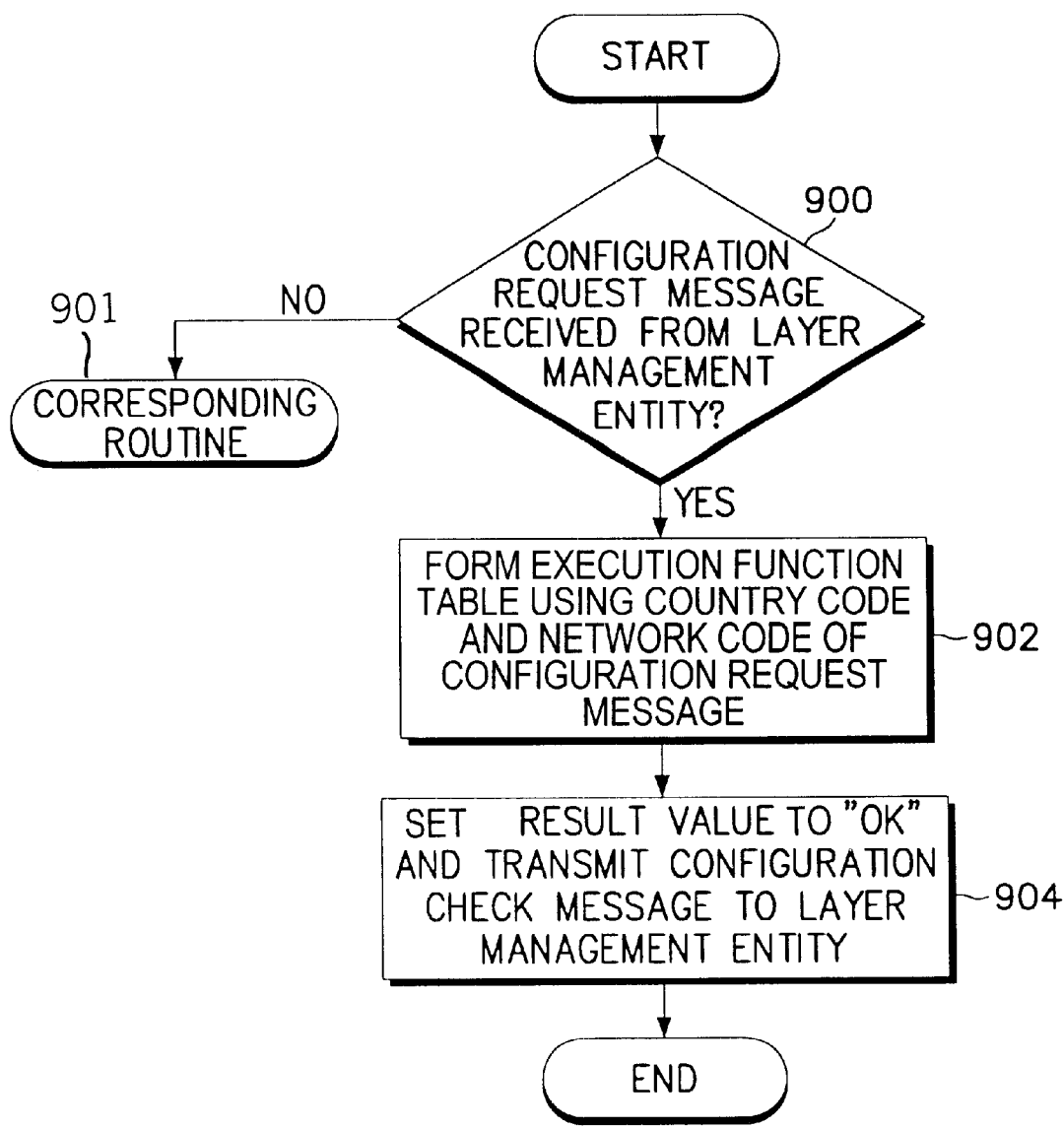
FIG. 9 is a flowchart showing processes for processing a physical entity according to an embodiment of the present invention.
Figure 10:
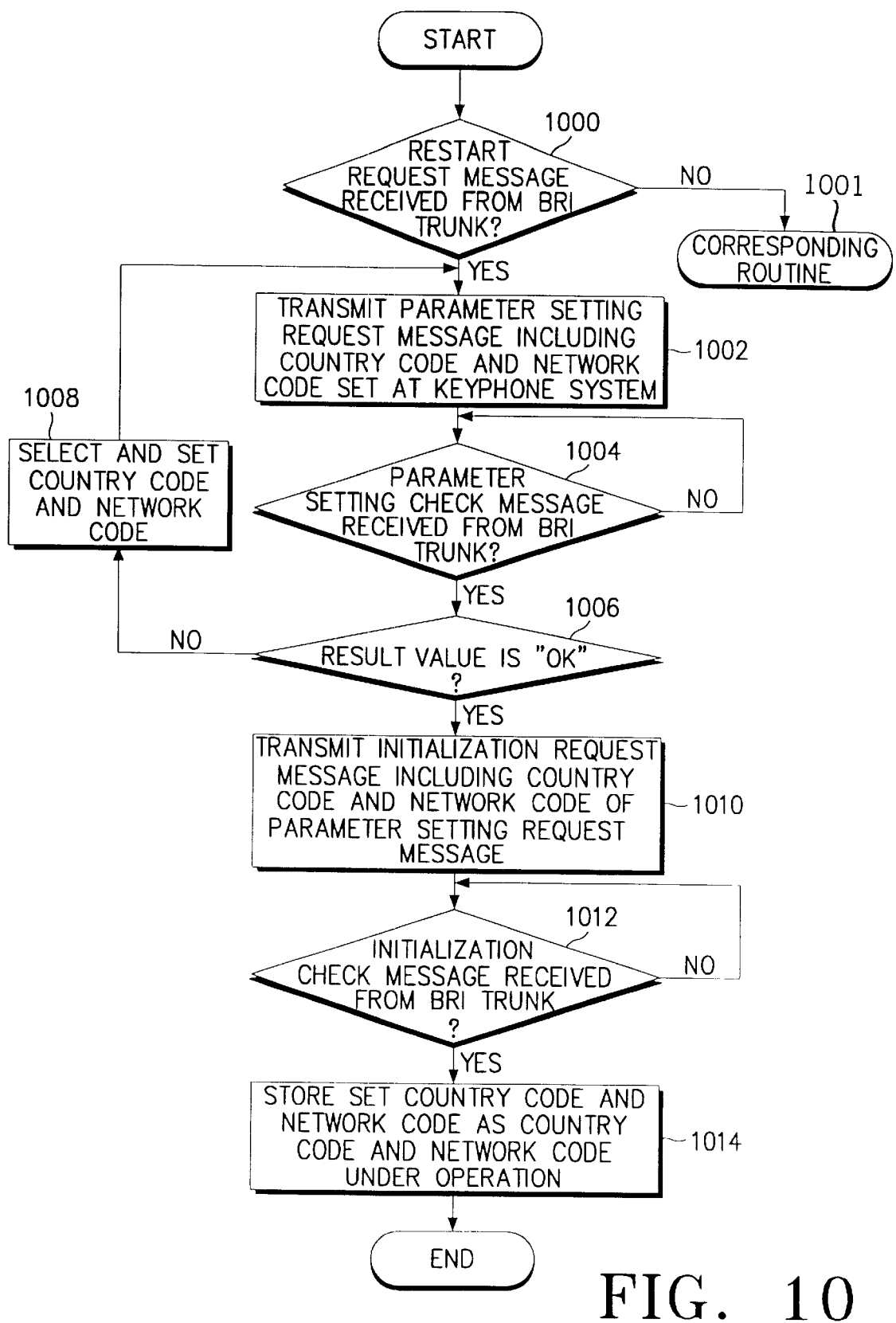
FIG. 10 is a flowchart showing processes for processing a main device of a keyphone system according to an embodiment of the present invention.

FIGS. 4A–4B and 9 are flowcharts showing processes for processing entities for performance of the configuration procedure according to an embodiment of the present invention, and FIG. 10 is a flowchart showing processes for processing the main device 102 of the keyphone system according to an embodiment of the present invention. Herein, for convenience, FIG. 4 is divided into FIGS. 4A and 4B and FIG. 5 is divided into FIGS. 5A and 5B. Also, FIG. 4A is followed by FIG. 4B and FIG. 5A is followed by FIG. 5B.

Figure 5A:
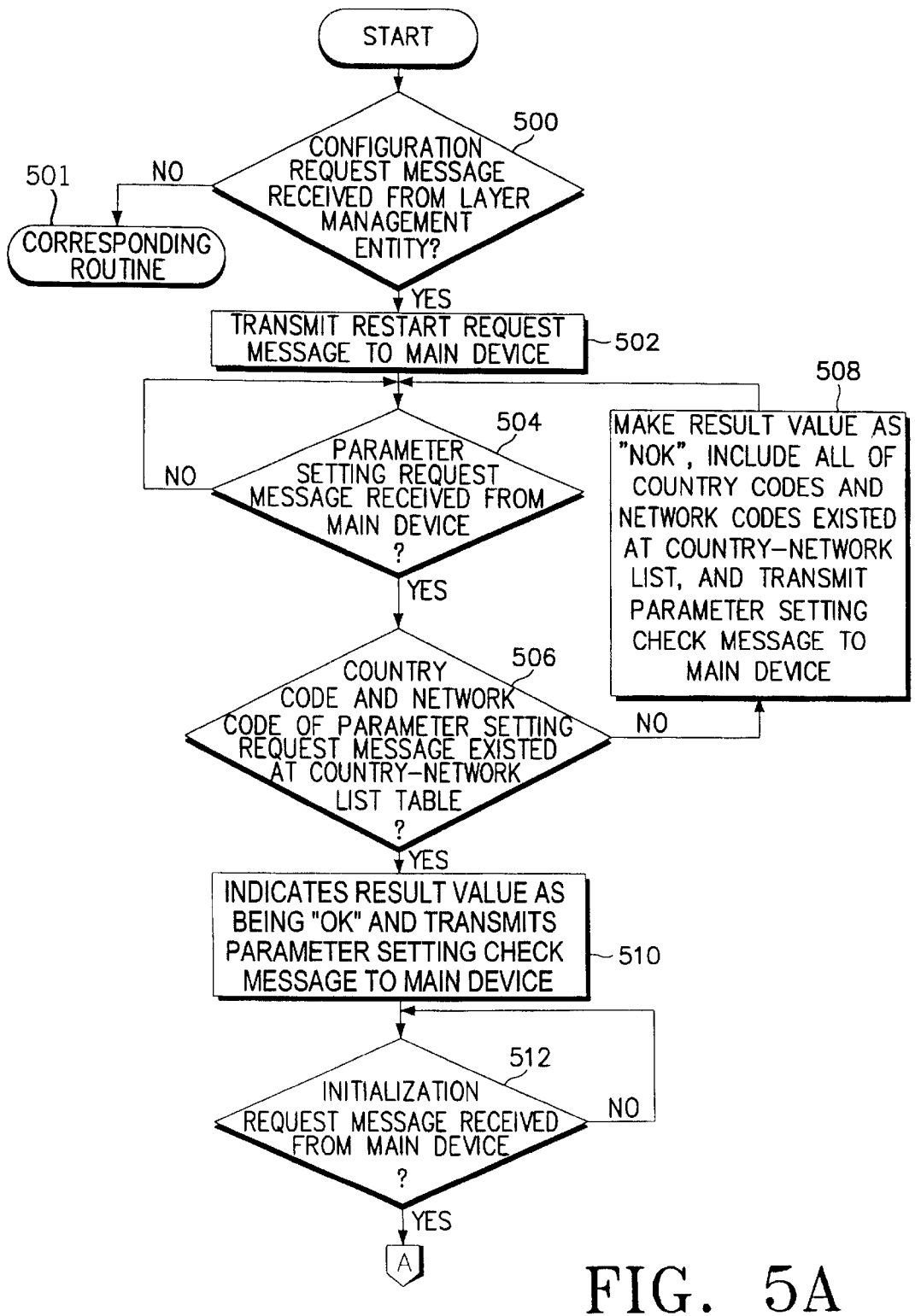
FIGS. 5A and 5B are flowcharts showing processes for processing an application entity according to an embodiment of the present invention.
Figure 5B:
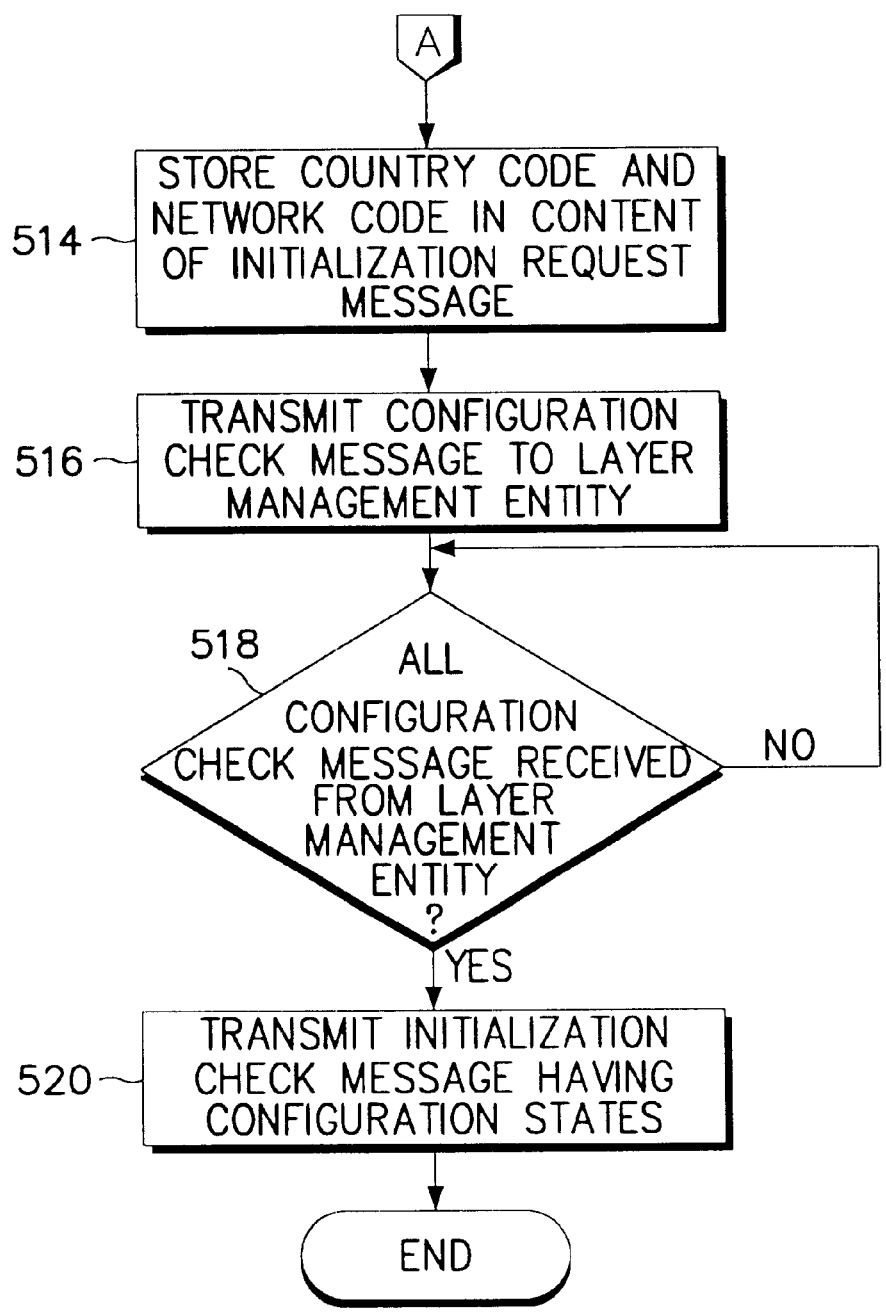

Therefore, FIGS. 4A and 4B are flowcharts showing processes for processing the layer management entity according to an embodiment of the present invention, and FIGS. 5A and 5B are flowcharts showing processes for processing the application entity according to an embodiment of the present invention.

When power is applied to the keyphone system or the BRI trunk 100 is reset, the CPU 104 starts the configuration procedure from the layer management entity 300, that is, checks at step 400 of FIG. 4A whether or not the configuration start message has been received from the main device 102 of the keyphone system. At this moment, the layer management entity 300 starts the configuration procedure according to an embodiment of the present invention by receiving the configuration start message to perform the configuration for each layer from the initial entity 100 as shown in FIG. 2 where the initial values necessary for the system are set to general initialization. Firstly, when the configuration start message is received, the layer management entity 300 performs step 402. However, when other messages except for the configuration start message have been received at step 400, the layer management entity 300 performs a corresponding routine 401. Thus, at step 402, the layer management entity 300 transmits the configuration request message MSG1, including the application configuration data, to the application entity 302. The application configuration data indicates ID(identification) representing the specific countries and kinds of networks preset as the default value, that is, the country codes and the network codes. Also, the configuration request message MSG1 is the message requesting the application entity 302 to perform the configuration procedure. After that, the layer management entity 300, at step 404, checks whether or not the configuration checking message MSG6 has been received from the application entity 302.

The application entity 302 checks, at step 500 of FIG. 5A, whether or not the configuration request message MSG1 has been received from the layer management entity 300 and, when the configuration request message MSG1 has been received therefrom, starts the configuration procedure at step 502. When other messages except for the configuration request message MSG1 have been received at step 500, the application entity 302 performs the corresponding routine 501 conventionally. The application entity 302, receiving the configuration request message MSG1 at step 500, transmits the restart request message MSG2 to the main device 102 of the keyphone system at step 502. The restart request message MSG2 is the message requesting the main device 102 of the keyphone system to start the new configuration procedure. Following that, the application entity 302 checks, at step 504, whether or not a parameter setting request message MSG3 has been received from the main device 102 of the keyphone system.

Then, the main device 102 of the keyphone system starts the configuration procedure by receiving the restart request message MSG2 from the application entity 302 of the BRI trunk 100 at step 1000 of FIG. 10. At this time, when other messages except for the restart request message MSG2 have been received therefrom at step 1000, the main device 102 of the keyphone system performs the corresponding routine 1001 conventionally. The main device 102 of the keyphone system, which receives the restart request message MSG2 at step 1000, transmits the parameter setting request message MSG3 included in the parameter values as the county code and the network code, set at the keyphone system by the operator of the keyphone system, to the BRI trunk 100 at step 1002. The parameter setting request message MSG3 is the message which requests the BRI trunk 100 to set the parameters set at the keyphone system by the operator.

Hereinafter, the main device 102 of the keyphone system checks, at step 1004, whether or not a parameter setting check message MSG4 is received from the BRI trunk 100.

Upon the application entity 302 receiving the parameter setting request message MSG3 from the main device 102 of the keyphone system at step 504, the application entity 302 checks, at step 506, whether or not the country code and the network code of the parameter values included in the parameter setting request message MSG3 exist in the country-network list table stored in the ROM 106. At this point, when other messages except for the parameter setting request message have been received at step 504, the application entity 302 ignores the received message. Also, the application entity 302 transmits the parameter setting check message MSG4 to the main device 102 of the keyphone system according to the checked result at step 506, and at steps 508 and 510. When the country code and the network code of the parameter values included in the parameter setting request message MSG3 exist in the country-network list table stored in the ROM 106, it means that the country code and the network code have been correctly set by the operator. However, when the country code and the network code of the parameter values included in the parameter setting request message MSG3 do not exist in the country-network list table stored at the ROM 106, it means that the country code and the network code have been incorrectly set.

Moreover, when the country code and the network code of the parameter values included in the parameter setting request message MSG3 exist in the country-network list table, the application entity 302 indicates the result value as being "OK", includes the values in the parameter setting check message MSG4, and transmits it to the main device 102 of the keyphone system at step 510. The parameter setting check message MSG4 is the message for informing the checked result for the parameter setting request, and "OK" indicates that the country code and the network code set in the keyphone system by the operator are correctly set. When the country code and the network code of the parameter values included in the parameter setting request message MSG3 do not exist in the country-network list table, the application entity 302 indicates the result value as being "NOK", includes all of the country codes and the network codes, existing in the country-network list table stored in the ROM 106, in the parameter setting check message MSG4, and transmits it to the main device 102 of the keyphone system at step 508. The "NOK" indicates that the country code and the network code set in the keyphone system by the operator are incorrectly set. When the country code and the network code of the parameter values included in the parameter setting request message MSG3 do not exist at the country-network list table, it means that the codes have been incorrectly set. Accordingly, the application entity 302 includes all of the country codes and the network codes in the parameter setting check message MSG4 existing in the country-network list table so as to set the message correctly and transmit it at step 510.

After that, upon the result value transmitted by being included in the parameter setting check message MSG4 being "OK", the application entity 302 checks, at step 512, whether or not an initialization request message MSG5 has been received from the main device 102 of the keyphone system. Unlike this, when the result value transmitted by being included in the parameter setting check message MSG4 is "NOK", the application entity 302 proceeds to step 504, thereby checking whether or not the parameter setting request message MSG3 has again been received from the main device 102 of the keyphone system.

When the main device 102 of the keyphone system receives the parameter setting check message MSG4 from the BRI trunk 100 as determined in step 1004 of FIG. 10, the main device 102 of the keyphone system checks, at step 1006, whether or not the result value included in the parameter setting check message MSG4 is "OK". In this event, once other messages except for the parameter setting check message MSG4 have been received in step 1004, the main device 102 of the keyphone system ignores the received message. However, when the result value included in the parameter setting check message MSG4 is "NOK", the main device 102 of the keyphone system displays the country code and the network code included in the content of the parameter setting check message MSG4 to be seen by the operator and again sets the country code and the network code selected by the operator of the keyphone system at step 1008. Here, the operator of the keyphone system checks all of the country codes and the network codes applicable at the BRI trunk 100, again selects and sets the right country code and the right network code. After setting the country code and the network code, the main device 102 of the keyphone system performs step 1002 once more. As a result, the main device 102 of the keyphone system again transmits the parameter setting request message MSG3, including the newly-set country code and network code, to the BRI trunk 100, and the application entity 302 of the BRI trunk 100 again performs steps 504 to 506 in response to the transmitted message.

To the contrary, when the result value included in the parameter setting check message MSG4 is "OK" in step 1006, the main device 102 of the keyphone system transmit the initialization request message MSG5, including the country code and the network code included in the parameter setting request message MSG3, to the BRI trunk 100 at step 1010. The initialization request message MSG5 is for the message requesting initialization of the BRI trunk 100 so as to perform the ISDN protocol corresponding to the country code and the network code included in the parameter setting request message MSG3. Next, the main device 102 of the keyphone system checks, at step 1012, whether or not an initialization check message MSG16 has been received from the BRI trunk 100.

When the application entity 302 received the initialization request message MSG5 from the main device 102 of the keyphone system at step 512, the application entity 302 performs step 514 of FIG. 5B. In this case, when other messages except for the initialization request message MSG5 have been received at step 512, the application entity 302 ignores the received message. Also, the application entity 302 changes the country code and the network code of the application configuration data into the country code and the network code included in the initialization request message MSG5 and stores the changed message in step 514. Thereafter, the application entity 302 includes the changed country code and network code in the configuration check message MSG6 with the application state value indicated as "OK" and transmits the included country code and network code to the layer management entity 300 at step 516. The configuration check message MSG6 is the message which informs the layer management entity 300 of the completion of the configuration procedure by the application entity 302. The transmission of the application state value being "OK" means that the configuration procedure of the application entity 302 has been normally completed. Hereinafter, the application entity 302 checks, at step 518, whether or not an all configuration check message MSG15 has been received from the layer management entity 300.

Upon the layer management entity 300 receiving the configuration check message MSG6 from the application entity 302 at step 404, the layer management entity 302 stores the application state value included in the configuration check message MSG6, and the country code and the network code of the application configuration data, at step 406. At this point, when other messages except for the configuration check message MSG6 have been received, the layer management entity 300 ignores the received message. Hereinafter, the layer management entity 300 performs steps 408 to 430, thereby enabling the call control entity 304, the network signaling entity 306, the data link entity 308, and the physical entity 310 to perform the configuration procedure sequentially. At step 408, the layer management entity 300 transmits the configuration request message MSG7 including the country code and the network code of the application configuration data included in the configuration check message MSG6 to the call control entity 304. The configuration request message MSG7 requests the configuration procedure performance to the call control entity 304. After that, the layer management entity 300 checks, at step 410, whether or not a configuration check message MSG8 has been received from the call control entity 304.

Figure 6:
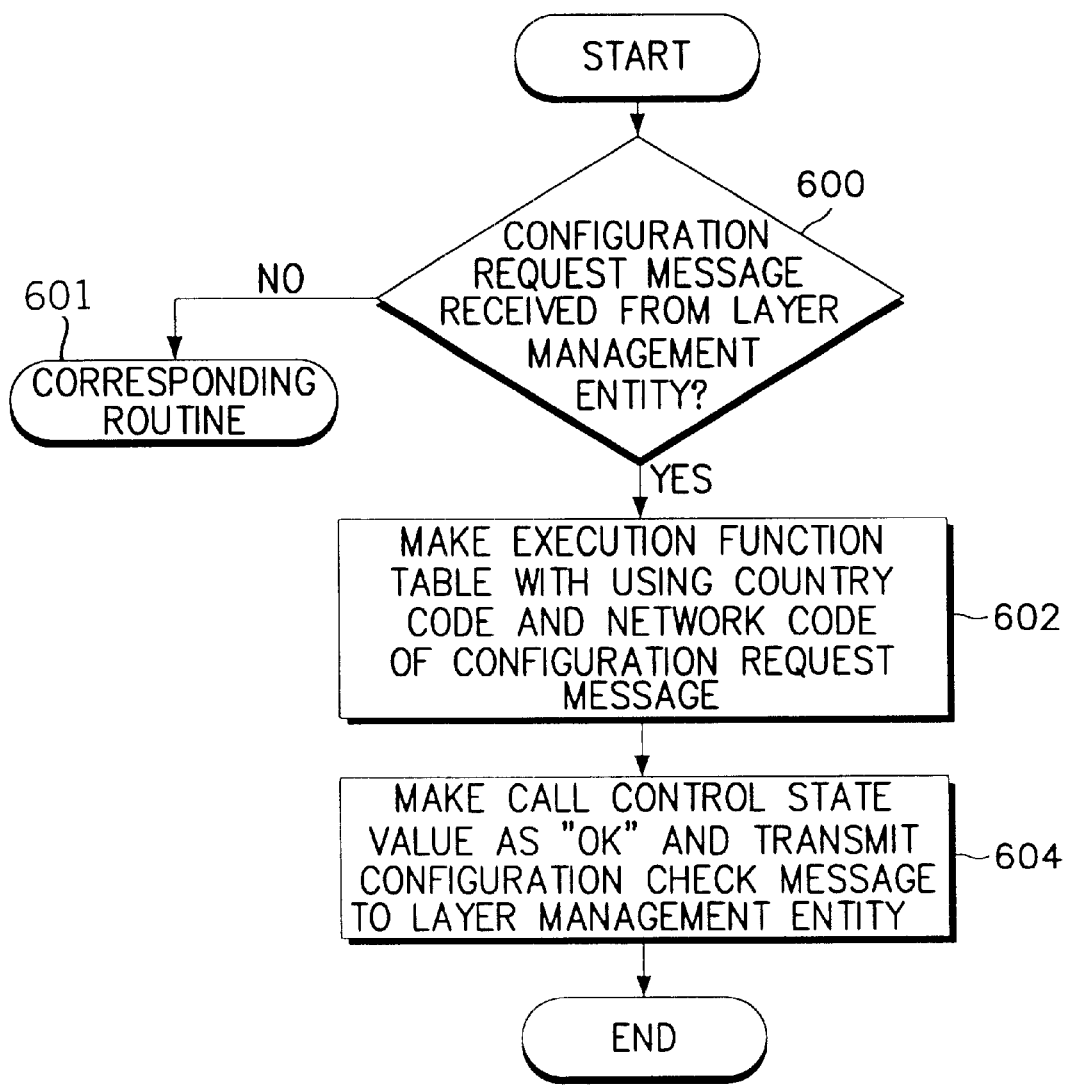
FIG. 6 is a flowchart showing processes for processing a call control entity according to an embodiment of the present invention.

Thus, the call control entity 304 starts the configuration procedure by determining that the configuration request message MSG7 is received from the layer management entity 300 at step 600 of FIG. 6. In this instance, in the case that other messages except for the configuration request message MSG7 have been received in step 600, the call control entity 304 performs the corresponding routine 601. However, at step 602, the call control entity 304, which receives the configuration request message MSG7, performs the configuration by forming the execution function table using the country code and the network code in the content of the configuration request message MSG7. In this case, the call control entity 304 forms the country code and the network code included in the configuration request message MSG7 among the function programs existing in the all function list table stored in the ROM 106, that is, the start address list of the function program corresponding to the country and the network to be currently operated, as the execution function table. In other words, the call control entity 304 selects the function program corresponding to the country and the network to be currently operated among the function programs stored in the ROM 106 and sets the execution function program. Accordingly, the call control entity 304 can perform the ISDN protocol according to the country and the network to be currently operated by the function program depending upon the execution function table formed as stated above. After that, the call control entity 304 sets the call control state value to "OK" and transmits the configuration check message MSG8 to the layer management entity 300, so that the configuration procedure can be completed. Here, the configuration check message MSG8 is the message for informing the layer management entity 300 of the completion of the configuration procedure. Also, the transmission of the call control value as "OK" represents that the configuration procedure of the call control entity 304 has been completed.

When the layer management entity 300 receives the configuration check message MSG8 from the call control entity 304 at step 410, the layer management entity 300 performs step 414 after storing the call control state value included in the configuration check message MSG8 at step 412. At this point, in the event that other messages except for the configuration check message MSG8 have been received therefrom, the layer management entity 302 ignores the received message. Thus, at step 414, the layer management entity 300 transmits the configuration request message MSG9 including the country code and the network code of the application configuration data included in the configuration check message MSG6 to the network signaling entity 306. The configuration request message MSG9 is the message requesting the configuration procedure performance to the network signaling entity 306. Thereafter, the layer management entity 300 checks, at step 416, whether or not the configuration check message MSG10 has been received from the network signaling entity 306.

Figure 7:
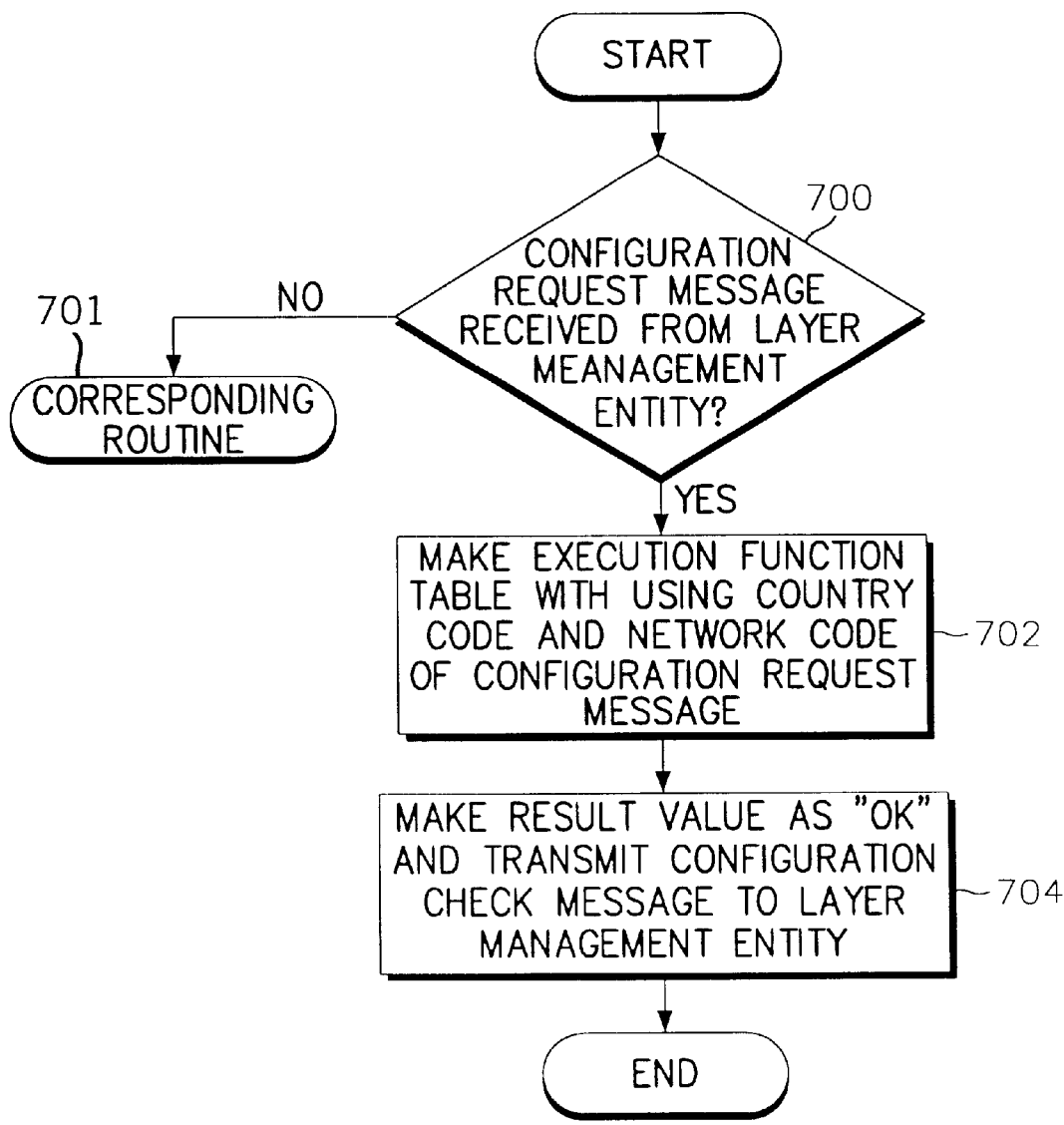
FIG. 7 is a flowchart showing processes for processing a network signaling entity according to an embodiment of the present invention.

Then, the network signaling entity 306 starts the configuration procedure by determining that the configuration request message MSG9 is received from the layer management entity 300 at step 700 of FIG. 7. In this instance, in the case that other messages except for the configuration request message MSG9 have been received at step 700, the network signaling entity 306 performs the corresponding routine 701. However, at step 702, the network signaling entity 304, receiving the configuration request message MSG9 in the above step 700, performs the configuration by forming the execution function table using the country code and the network code in the content of the configuration request message MSG. In this case, the network signaling entity 306 forms the country code and the network code included in the configuration request message MSG9 among the function programs existing in the all function list table stored in the ROM 106, that is, the start address list of the function program corresponding to the country and the network to be currently operated by the network signaling entity 306, as the execution function table. In other words, the network signaling entity 306 selects the function program corresponding to the country and the network to be currently operated from among the function programs stored in the ROM 106 and sets the execution function program. Accordingly, the network signaling entity 306 can perform the ISDN protocol according to the country and the network to be currently operated by the function program depending upon the execution function table formed as stated above. After that, at step 704, the network signaling entity 306 sets the network signaling state value to "OK", and transmits the configuration check message MSG10 to the layer management entity 300 so that the configuration procedure can be completed. The configuration check message MSG10 is the message for informing the layer management entity 300 of the completion of the configuration procedure by the network signaling entity 306. Also, the transmission of the network signaling "OK" value represents that the configuration procedure of the network signaling entity 306 has been completed.

When the layer management entity 300 receives the configuration check message MSG10 from the network signaling entity 306, the layer management entity 300 performs step 420 after storing the network signaling state value included in the configuration check message MSG1 at step 418 of FIG. 4B. At this point, in the event that messages other than the configuration check message MSG10 have been received therefrom, the layer management entity 300 ignores the received message. Thus, at step 420, the layer management entity 300 transmits the configuration request message MSG11 including the country code and the network code of the application configuration data included in the configuration check message MSG6 to the data link entity 308. The configuration request message MSG11 is the message requesting the configuration procedure performance to the data link entity 308. Thereafter, the layer management entity 300 checks, at step 422, whether or not the configuration check message MSG12 has been received from the data link entity 308.

Figure 8:
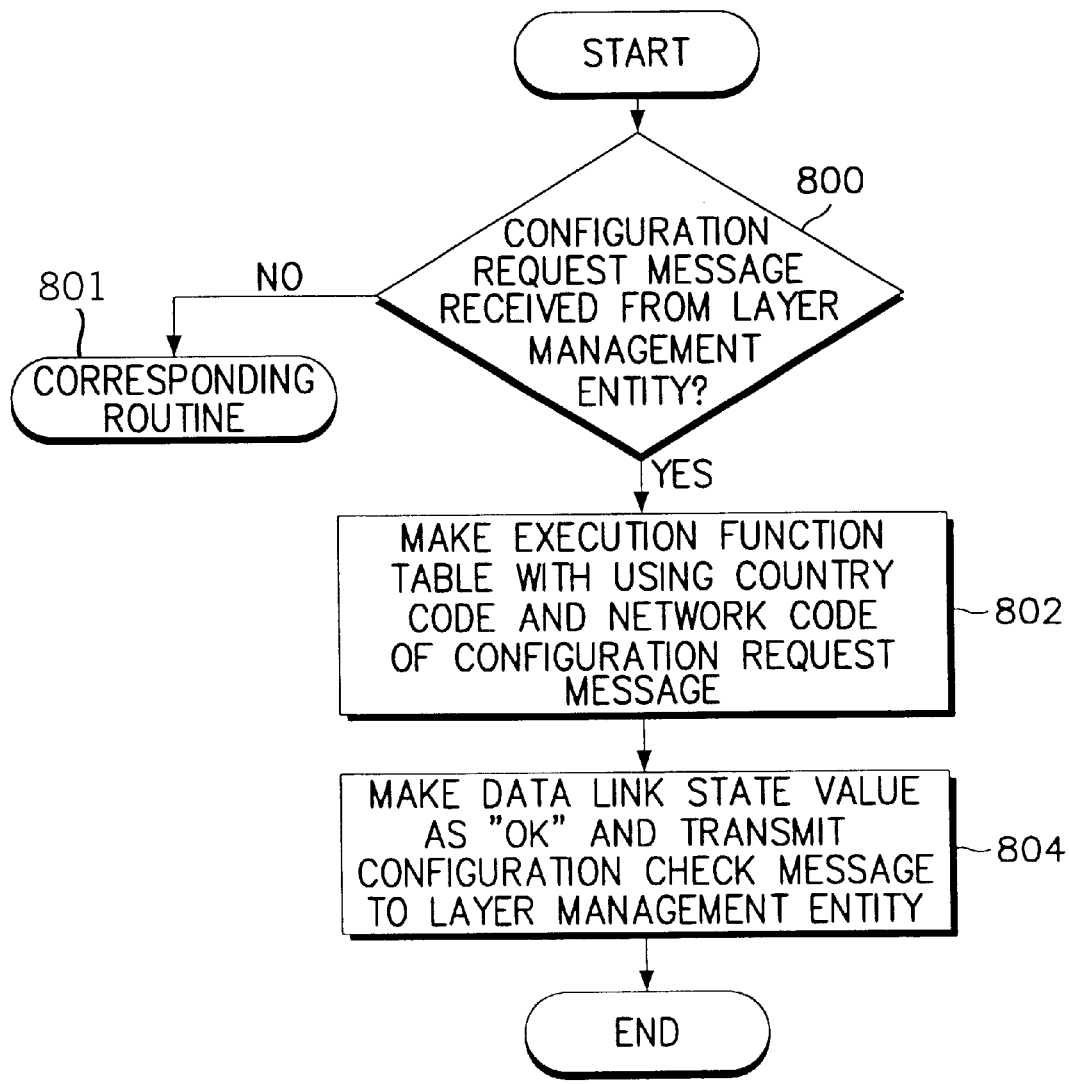
FIG. 8 is a flowchart showing processes for processing a data link entity according to an embodiment of the present invention.

Then, the data link entity 308 starts the configuration procedure by determining that the configuration request message MSG11 is received from the layer management entity 300 at step 800 of FIG. 8. In this instance, in the case that messages other than the configuration request message MSG11 have been received at step 800, the data link entity 308 performs the corresponding routine 801. However, at step 802, the data link entity 308, receiving the configuration request message MSG11 at step 800, performs the configuration by forming the execution function table using the country code and the network code in the content of the configuration request message MSG11. In this case, the data link entity 308 forms the country code and the network code included in the configuration request message MSG11 from among the function programs existing in the all function list table stored in the ROM 106, that is, the start address list of the function program corresponding to the country and the network to be currently operated, as the execution function table. In other words, the data link entity 308 selects the function program corresponding to the country and the network to be currently operated from among the function programs stored in the ROM 106 and sets the execution function program. Accordingly, the data link entity 308 can perform the ISDN protocol according to the country and the network to be currently operated by the function program depending upon the execution function table formed as stated above. After that, at step 804, the network signaling entity 306 sets the data link state value to "OK" and transmits the configuration check message MSG12 to the layer management entity 300 so that the configuration procedure can be completed. The configuration check message MSG12 is the message informing the layer management entity 300 of the completion of the configuration procedure by the data link entity 308. Also, the transmission of the data link value as "OK" represents that the configuration procedure of the data link entity 308 has been completed.

Upon the layer management entity 300 receiving the configuration check message MSG12 from the data link entity 308 at step 422, the layer management entity 300 performs step 426 after storing the data link state value included in the configuration check message MSG12 at step 424. At this point, in the event that messages other than the configuration check message MSG12 have been received therefrom, the layer management entity 300 ignores the received message. Thus, at step 426, the layer management entity 300 transmits the configuration request message MSG13, including the country code and the network code of the application configuration data included in the configuration check message MSG6, to the physical entity 310. The configuration request message MSG13 is the message requesting the configuration procedure performance to the physical entity 310. Thereafter, the layer management entity 300 checks, at step 428, whether or not the configuration check message MSG14 has been received from the physical entity 310.

Then, the physical entity 310 starts the configuration procedure by determining that the configuration request message MSG13 is received from the layer management entity 300 at step 900 of FIG. 9. In this instance, if messages other than the configuration request message MSG13 have been received in step 900, the physical entity 310 performs the corresponding routine 901. However, at step 902, the physical entity 310, receiving the configuration request message MSG13 at step 900, performs the configuration by forming the execution function table using the country code and the network code in the content of the configuration request message MSG13. In this case, the physical entity 310 forms the country code and the network code included in the configuration request message MSG13 from among the function programs existing in the all function list table stored in the ROM 106, that is, the start address list of the function program corresponding to the country and the network to be currently operated, as the execution function table. In other words, the physical entity 310 selects the function program corresponding to the country and the network to be currently operated from among the function programs stored in the ROM 106 and sets the execution function program. Accordingly, the physical entity 310 can perform the ISDN protocol according to the country and the network to be currently operated by the function program depending upon the execution function table formed as stated above. After that, at step 904, the physical entity 310 sets the data link state value to "OK" and transmits the configuration check message MSG14 to the layer management entity 300 so that the configuration procedure can be completed. The configuration check message MSG14 is the message informing the layer management entity 300 of the completion of the configuration procedure by the physical entity 310. Also, the transmission of the data link value as "OK" represents that the configuration procedure of the physical entity 310 has been completed.

Upon the layer management entity 300 receiving the configuration check message MSG14 from the physical entity 310 at step 428, the layer management entity 300 performs step 432 after storing the physical state value included in the configuration check message MSG14 at step 430. At this point, in the event that messages other than the configuration check message MSG14 have been received therefrom, the layer management entity 300 ignores the received message. Thus, at the above step 432, the layer management entity 300 ends the configuration procedure by transmitting the all configuration check message MSG15 having the configuration state of all entities (that is, the information such as the application state value, the call control state value, the network signaling state value, the data link state value, and the physical state value) to the application entity 302. The all configuration check message MSG15 is the message informing of the completion of the configuration state of all entities.

Once the application entity 302 receives the all configuration check message MSG15 at step 518, the application entity 302 completes the configuration procedure by transmitting the initialization check message MSG16, having the configuration state of all entities included in the all configuration check message MSG15, to the main device 102 of the keyphone system at step 520. At this time, when messages other than the all configuration check message MSG15 have been received, the application entity 302 ignores the received message. The initialization check message MSG16 represents the completion of the configuration operation in order to perform the ISDN protocol for the country and the network to be currently operated by the BRI trunk 100, that is, to perform all of entities for the ISDN protocol.

When the all configuration procedure of the BRI trunk 100 is completed by the above operation, the BRI trunk 100 performs the normal operation. That is, the BRI hunk 100 can perform normal service by performing the ISDN protocol according to the country and the network to be currently operated by the function program as the execution function table formed by the configuration procedure as stated above.

Meanwhile, upon the main device 102 of the keyphone system receiving the initialization check message MSG16 at step 1012, the main device 102 of the keyphone system completes the configuration procedure after storing the country code and the network code set by the operator at step 1014. Namely, the main device 102 of the keyphone system stores the country code and the network code as the currently-operated country code and network code with the above configuration order. Here, when messages other than the initialization check message MSG16 have been received, the main device 102 of the keyphone system ignores the received message.

Accordingly, it is unnecessary to replace the ROM 106 of the BRI trunk 100 with a new ROM even when the country and the network are varied by making the execution function table select the function program according to the country and the network to be currently operated from the all configuration function list table. That is to say, one BRI trunk 100 can be commonly used in all countries and networks which have protocols different from one another.

As is apparent from the foregoing, the present invention has no need to replace the ROM storing the program for performance of the ISDN protocol with a new ROM whenever the country and the network are varied by commonly using one BRI trunk for all countries and networks which have ISDN protocols different from one another.

While there has been illustrated and described what are considered to be preferred embodiments of the present invention, it will be understood be those skilled in the art that various changes and modifications may be made, and equivalents may be substituted for elements thereof, without departing from the true scope of the present invention. In addition, many modifications may be made to adapt a particular situation to the teaching of the present invention without departing from the central scope thereof. Therefore, it is intended that the present invention not be limited to the particular embodiments disclosed as the best modes contemplated for carrying out the present invention, but that the present invention include all embodiments falling within the scope of the appended claims.

What is claimed is:

1. A method for configuring a network interface circuit in an integrated services digital network keyphone system, comprising the steps of:

storing, in a read only memory (ROM) of the network interface circuit, all functions programs supporting an integrated services digital network protocol for each country and each network which will be used by the keyphone system;

selecting a function program corresponding to a country and a kind of network to be operated upon initialization from among the function programs stored in the ROM; and setting the selected function program as an execution functional program;

wherein said initialization is executed when said keyphone system is power on reset and said network interface circuit is reset;

wherein said method is carried out by software including at least one of the following modules: an application entity, a call control entity, a network signaling entity, a data link entity, and a physical entity;

said method further comprising the step of receiving a country code and a network code to be currently operated from a main device of said keyphone system through the application entity by the layer management entity upon initialization; and wherein said selecting step is carried out by the call control entity, the network signaling entity, the data link entity and the physical entity, and wherein the selecting step comprises:

requesting said call control entity, said network signaling entity, said data link entity and said physical entity to perform a configuration for said country code and said network code sequentially by said layer management entity;

selecting a function program for said country code and said network code according to a configuration need from said layer management entity by said call control entity, said network signaling entity, said data link entity and said physical entity, from among the function programs stored in said ROM and setting the selected program as the execution functional program; and informing of configuration completion by said layer management entity through said application entity to said main device after completing the configuration of said call control entity, said network signaling entity, said data link entity, and said physical entity.

2. The method as defined in claim 1, said integrated services digital network protocol being performed according to said execution function program upon normal operation of said system.

3. The method as defined in claim 1, further comprising:

upon said country code and said network code not being supported by the function program stored in said ROM, transmitting all of the country codes and all of the network codes corresponding to the function programs stored in said ROM to said main device by said layer management entity; and displaying all of the country codes and all of the network codes received from said layer management entity by said main device, and transmitting a country code and network code, set again by an operator, to said layer management entity.

4. A method for configuring a network interface circuit in an integrated services digital network keyphone system, comprising the steps of:

storing, in a read only memory (ROM) of the network interface circuit, all function programs supporting an integrated services digital network protocol for each country and each network which will be used by the keyphone system;

receiving a country code and a network code to be currently operated from a main device of said keyphone system upon initialization; and selecting a function program corresponding to said country code and said network code from among the function programs stored in said ROM and setting the selected program as an execution function program;

wherein said initialization is executed when said keyphone system is power on reset and said network interface circuit is reset;

wherein said method is carried out by software including at least one of the following modules: an application entity, a call control entity, a network signaling entity, a data link entity, and a physical entity;

wherein the receiving step is carried out through the application entity by the layer management entity upon initialization; and wherein said selecting step is carried out by the call control entity, the network signaling entity, the data link entity and the physical entity, and wherein the selecting step comprises:

requesting said call control entity, said network signaling entity, said data link entity and said physical entity to perform a configuration for said country code and said network code sequentially by said layer management entity;

selecting a function program for said country code and said network code according to a configuration need from said layer management entity by said call control entity, said network signaling entity, said data link entity and said physical entity, from among the function programs stored in said ROM and setting the selected program as the execution function program; and informing of configuration completion by said layer management entity through said application entity to said main device after completing the configuration of said call control entity, said network signaling entity, said data link entity, and said physical entity.

5. The method as defined in claim 4, said country code and said network code being set in correspondence with the countries and kinds of networks to be currently operated by an operator of said keyphone system.

6. The method as defined in claim 5, further comprising:

executing said integrated services digital network protocol in accordance with said execution function program upon normal operation of said system after completion of configuration.

7. The method as defined in claim 6, wherein all of the country codes and all of the network codes corresponding to the function programs stored in said ROM are transmitted to said main device and are again set, upon said country code and said network code not being supported by the function program stored in said ROM.

8. The method as defined in claim 4, further comprising:

upon said country code and said network code not being supported by the function program stored in said ROM, transmitting all of the country codes and all of the network codes corresponding to the function programs stored in said ROM to said main device by said layer management entity; and displaying all of the country codes and all of the network codes received from said layer management entity by said main device, and transmitting a country code and network code, set again by an operator, to said layer management entity.

9. A method for configuring a network interface circuit in an integrated services digital network keyphone system, comprising the steps of:

(a) storing, in a read only memory (ROM) of the network interface circuit, all function programs supporting an integrated services digital network protocol for each country and each network which will be used by said keyphone system, and receiving a country code and a network code to be currently operated from a main device of said keyphone system through an application entity by a layer management entity upon initialization; and (b) selecting a function program corresponding to said country code and said network code from among the function programs stored in said ROM by a call control entity, a network signaling entity, a data link entity and a physical entity, and setting the selected program as an execution function program;

wherein step (b) comprises:

(c) requesting said call control entity, said network signaling entity, said data link entity and said physical entity to perform a configuration for said country code and said network code sequentially by said layer management entity;

(d) selecting a function program for said country code and said network code according to a configuration need from said layer management entity by said call control entity, said network signaling entity, said data link entity and said physical entity, from among the function programs stored in said ROM and setting the selected program as the execution function program; and (e) informing of configuration completion by said layer management entity through said application entity to said main device after completing the configuration of said call control entity, said network signaling entity, said data link entity, and said physical entity.

10. The method as defined in claim 9, said step (d) being executed by forming a start address list of said execution function programs as an execution table.

11. The method as defined in claim 10, said initialization being executed when said keyphone system is power on reset and said network interface circuit is reset.

12. The method as defined in claim 11, said country code and said network code being set in correspondence with countries and kind of networks to be currently operated by an operator of said keyphone system.

13. The method as defined in claim 12, further comprising:

executing said integrated services digital network protocol in accordance with said execution function program upon normal operation of the system after the completion of configuration.

14. The method as defined in claim 13, further comprising:

upon said country code and said network code not being supported by the function program stored in said ROM, transmitting all of the country codes and all of the network codes corresponding to the function programs stored in said ROM to said main device by said layer management entity; and displaying all of the country codes and all of the network codes received from said layer management entity by said main device, and transmitting a country code and network code, set again by said operator, to said layer management entity.

15. The method as defined in claim 11, further comprising:

upon said country code and said network code not being supported by the function program stored in said ROM, transmitting all of the country codes and network codes corresponding to the function programs stored in said ROM to said main device by said layer management entity; and displaying all of the country codes and network codes received from said layer management entity by said main device, and transmitting a country code and network code, set again by an operator, to said layer management entity.

16. The method as defined in claim 9, said initialization being executed when said keyphone system is power on reset and said network interface circuit is reset.

17. The method as defined in claim 16, further comprising:

upon said country code and said network code not being supported by the function program stored in said ROM, transmitting all of the country codes and network codes corresponding to the function programs stored in said ROM to said main device by said layer management entity; and displaying all of the country codes and network codes received from said layer management entity by said main device, and transmitting a country code and network code, set again by an operator, to said layer management entity.

18. The method as defined in claim 9, said initialization being executed when said keyphone system is power on reset and said network interface circuit is reset.

19. The method as defined in claim 18, further comprising:

upon said country code and said network code not being supported by the function program stored in said ROM, transmitting all of the country codes and network codes corresponding to the function programs stored in said ROM to said main device by said layer management entity; and displaying all of the country codes and network codes received from said layer management entity by said main device, and transmitting a country code and network code, set again by an operator, to said layer management entity.

20. The method as defined in claim 9, further comprising:

upon said country code and said network code not being supported by the function program stored in said ROM, transmitting all of the country codes and network codes corresponding to the function programs stored in said ROM to said main device by said layer management entity; and displaying all of the country codes and network codes received from said layer management entity by said main device, and transmitting a country code and network code, set again by an operator, to said layer management entity.

* * * * *